Oct. 9, 1951    W. R. MEYER    2,570,964
CRANKSHAFT CHUCK
Filed Feb. 8, 1949    2 Sheets-Sheet 1

INVENTOR.
WALTER R. MEYER
BY Willard S. Grant
ATTORNEY.

Oct. 9, 1951 W. R. MEYER 2,570,964
CRANKSHAFT CHUCK
Filed Feb. 8, 1949 2 Sheets-Sheet 2

INVENTOR.
WALTER R. MEYER
BY
ATTORNEY.

Patented Oct. 9, 1951

2,570,964

UNITED STATES PATENT OFFICE 2,570,964

CRANKSHAFT CHUCK

Walter R. Meyer, Cincinnati, Ohio, assignor to The R. K. Le Blond Machine Tool Co., Cincinnati, Ohio, a corporation of Delaware Application February 8, 1949, Serial No. 75,153

3 Claims. (Cl. 82—40)

1

This invention pertains to crankshaft chucks for use with center drive crankshaft lathes. More particularly this invention pertains to improved supporting and clamping mechanism for a center drive crankshaft chuck.

One of the objects of this invention is to provide an improved center drive chuck supporting and clamping mechanism adapted to engage a peripheral premachined locating area on a web of a crankshaft.

Another object of this invention is to provide in a crankshaft chuck an improved clamping mechanism in which a single operating wrench socket shaft provides the sole means for tightening and loosening the clamping device on the work and positioning the clamp in loading and unloading position or in clamping position.

Another object is to provide a clamping mechanism in connection with the aforementioned center drive chuck which is so arranged as to simultaneously hold the crankshaft premachined locating area against the mating arcuate locating area fixed in the chuck and to at the same time hold the crankshaft web in positive engagement with the driving lug of the chuck.

A still further object of this invention is to provide a clamp in conjunction with the aforementioned chuck which acts with a tangential clamping force relative to the axis of rotation of the chuck and which has a releasable clamp member which is pivotally mounted for rocking movement in a plane perpendicular to the direction of clamping force so as to facilitate the loading and unloading of the chuck.

Other objects and advantages of this invention will become apparent from the following description.

Figure 4:
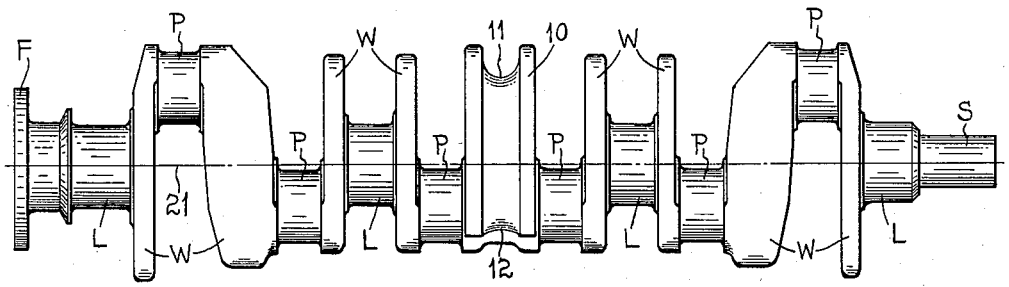
Figure 4 is a view of a crankshaft adapted for use with a chuck having the features of this invention.

Referring particularly to Figure 4, there is shown a typical multi-throw crankshaft having a series of line bearings L, a flange F and stub end S. There is a series of crankpins P which are interconnected with the line bearings L by

2 webs W. In this particular instance, the crankshaft has an intermediate web 10 on which there is provided a premachined peripheral locating surface comprising the areas 11 and 12 which may be machined thereon in a manner as set forth in Patent 2,141,466.

Figure 1:
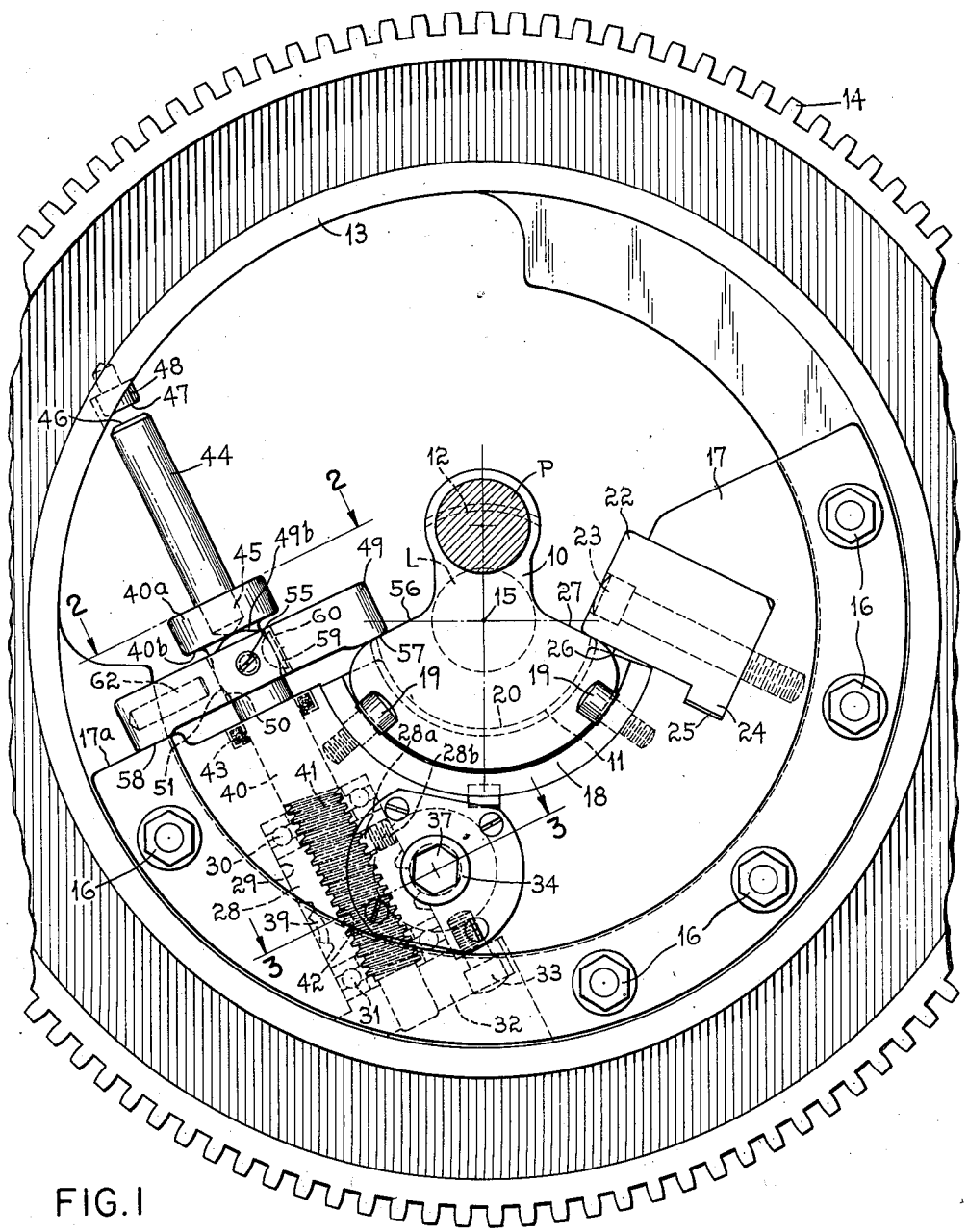
Figure 1 is a side elevation of a center drive crankshaft chuck incorporating the features of this invention.

Referring particularly to Figure 1, there is shown a center drive ring gear 13 having the usual driving gear teeth 14 and which is journaled in a well known conventional manner in a center drive housing of a center drive lathe for rotation about an axis 15. Fixed to the ring gear 13 by suitable clamping screws 16 is the segmental support member 17 to which is fixed an arcuate locating block 18 by suitable screws 19. The arcuate block 18 is provided with an accurately finished locating surface 20 which engages the premachined surface 11 of the crankshaft web 10 so as to position the axis 21, Figure 4, of the line bearings L of the crankshaft on the axis of rotation 15 of the chuck.

Also fixed on the member 17 is the driving lug block 22 by a suitable screw 23 and further secured to the member 17 by the tongue 24 engaging in the key-way 25. The lug block 22 has an abutment driving surface 26 which is adapted to engage the substantially radially disposed surface 27 of the crankshaft web 10 so as to positively circumferentially position or index the crankshaft in the chuck.

Novel clamping mechanism is provided to hold the crankshaft in the chuck by means of the surface 11 of the crankshaft in engagement with the surface 20 of the arcuate locating block 18 and to also at the same time hold the surface 27 of the web 10 of the crankshaft against the face 26 of the lug block 22. This clamping mechanism comprises a rotatable nut 28 journaled in a bore 29 formed in the member 17 and is confined against axial movement by suitable thrust bearings 30 and 31 held in position in the bore 29 by the cap 32 bolted to the member 17 by the screw 33. The nut is rotated by means of a wrench socket shaft 34 journaled against axial movement on suitable bearings 35 and 36 in the member 17. A suitable wrench socket 37 is formed in the end of the shaft 34 to which may be applied a wrench for rotating the shaft in tightening and loosening the chuck.

Figure 2:
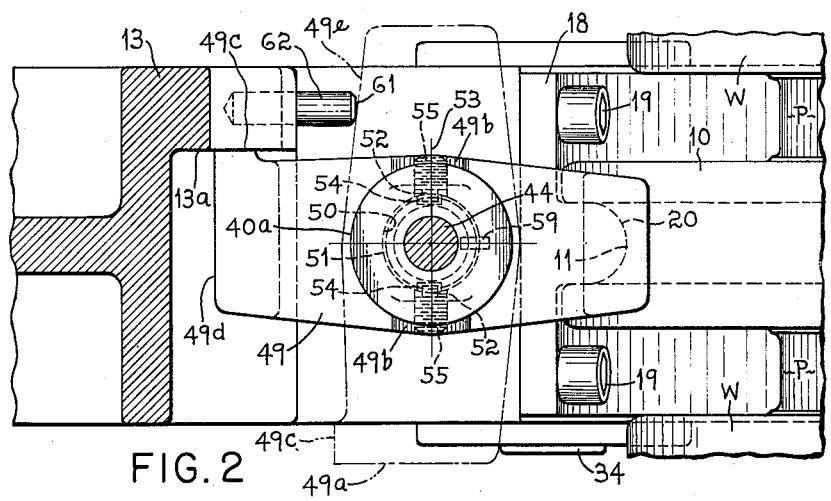
Figure 2 is an enlarged fragmentary section on the line 2—2 of Figure 1 particularly showing the swinging clamp member.

On the socket shaft 34 is formed a worm 38 which in turn engages a worm wheel 39 formed integral with the periphery of the nut 28 so that rotation of the socket shaft 34 effects a powerful geared down rotation of the nut 28. A threaded clamp screw 40 has a threaded portion 41 operatively engaging in the threaded bore 42 of the nut 28 so as to be axially reciprocated upon rotation of the nut 28. The screw 40 projects outwardly through a suitable packing 43 from the member 17 and has an enlarged headed portion 40a which has an abutment surface 40b engaging the arcuate surfaces 49b disposed on the clamp member 49 each side of the screw 40 as best seen in Figure 2. A stop plunger 44 is fixed at 45 into the headed portion 40a and has an abutment surface adapted to engage the abutment surface 47 of an abutment plug 48 fixed in the ring gear 13 to limit the outward axial movement of the screw 40.

Carried on the screw 40 is the swinging clamp member 49 which has an enlarged bore 50 nicely contacting the convex annular surface 51 formed around the screw 40. The radius of the surface 49b originates on the axis 53 of clearance holes 54 disposed diametrically in the screw 40. Set screws 55 carried in the clamp 49 have dog point ends 52 of smaller diameter projecting into the clearance holes 54.

The dog point ends are normally centered in non-contacting positions in the hole 54 when the surface 49b is in contact with surface 40b so as to allow the clamp member 49 a limited amount of pivotal movement around the axis 53 while causing the clamp as a whole to be moved bodily in unclamping direction with the axial movement of the screw 40. This pivotal motion is for the purpose of compensating for any variation in the position of the surface 56 of the crankshaft 10 engaged by the toe surface 57 of the clamp member 49 and the abutment surface 17a of the member 17 engaged by the heel surface 58 of the clamp member. A key 59 carried in the screw 40 engages in a keyway 60 formed in the bore 50 of the clamp member 49 so as to cause the clamp member 49 to rotate with the screw 40.

Figure 3:
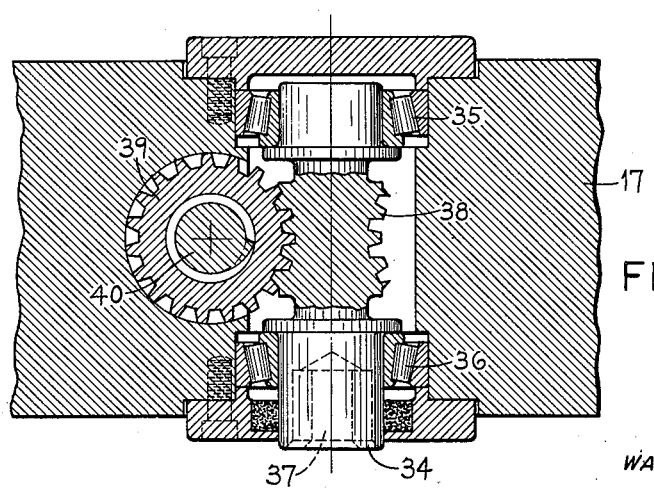
Figure 3 is an enlarged fragmentary section on the line 3—3 of Figure 1 particularly showing the worm and nut clamping mechanism.

The operation of the chuck is as follows: the crankshaft is placed in the chuck with its surface 11 engaging the surface 20 of the arcuate block 18 and the crankshaft is rotated counter-clockwise as seen in Figure 1, to bring the surface 27 of the web 10 up against the abutment surface 26 of the lug block 22. At this time the clamping mechanism has been moved to released position by rotating the socket shaft 34 with a suitable wrench so as to rotate the nut 28 in a counter-clockwise direction as shown in Figure 3, which causes the screw 40 to be moved axially outward to engage the abutment surface 46 with the abutment surface 47 on the plug 48, Figure 1. This also has caused the clamp member 49 to move to the position 49a, Figure 2, with the surface 49e of the clamp engaging the end 61 of the stop pin 62 fixed in the ring gear 13. A segmental nut plug 28a engaging the threaded portion 41 of the screw 40 is carried in the nut 28 and is backed up by an adjusting screw 28b so as to maintain the desired frictional relationship between the nut and screw so that the nut can properly rotate the screw and swing the clamp to or from clamping position.

As soon as the crankshaft has been placed in the chuck as recited above, the operator then rotates the socket shaft 34 so as to rotate the nut 28 in a clockwise direction as seen in Figure 3. This causes the screw 40 and the clamp member 49 to partially rotate in a clockwise direction until the abutment surface 49c of the clamp member 49 engages the abutment surface 13a of the ring gear 13. This brings the clamp member into clamping position with its heel portion 58 over the surface 17a of the member 17 while at the same time bringing the nose portion 57 of the clamp member 49 over the web surface 56. Continued rotation of the nut 28 in a clockwise direction, Figure 3, causes the screw 40 to be drawn axially inwardly so that the abutment surface 40b engages the arcuate surface 49b to draw the clamp surfaces 57 and 58 of the clamp member 49 firmly against the respective surfaces 56 and 17a of the crankshaft and the member 17 of the chuck. This causes the crankshaft to be firmly locked simultaneously against the surfaces 20 and 26 of the chuck. Thus in clamping the work in the chuck the clamp member 49 is automatically swung from loading and unloading position 49a, Figure 2, to clamping position 49d and then brought down and clamped firmly on the work solely by rotation of the socket wrench shaft 34.

To release the chuck from clamp position the socket wrench shaft 34 is operated to released position so as to rotate the nut in a counter-clockwise direction, Figure 3, to cause the screw 40 to move axially outwardly until pressure between the clamp member 49 and the crankshaft surface 56 is released, at which time the screw 40 is then free and partially rotates so as to move the clamp member 49 from position 49d to position 49a where the clamp and screw rotation is stopped by engagement of the surfaces 49e of the clamp 49 with the surface 61 of the pin 62. The screw then continues to move axially until the surfaces 46 and 47 abut together and stop further rotation of the nut 28 with the chuck in fully unclamped position. Thus in the unclamping operation the clamp member 49 is first released from the work and then automatically, upon further releasing of the chuck, the clamp is automatically swung out of the way to facilitate loading and unloading the work in the chuck.

The foregoing description is to be taken as illustrative of a preferred form of the invention rather than in a limiting sense. It is desired to reserve all changes, alterations, and substitutions as fall within the scope of the following claims.

Having now fully disclosed this invention, what is claimed as new and desired to be secured by United States Letters Patent is:

1. In a crankshaft chuck, a rotary chuck body, an arcuate locating block fixed to the chuck body having an arcuate surface arranged concentric with the axis of rotation of the chuck body, a driving block fixed to said chuck having a radially disposed abutment driving surface positioned at one end of said arcuate locating block, and clamping means located at the other end of said arcuate locating block comprising, a nut journaled in and restricted against axial movement in said chuck body, a worm wheel formed on said nut, a worm journaled in said chuck body and operatively engaging said worm wheel, means for applying a wrench to rotate said worm, a screw journaled for both rotation and axial sliding movement in said chuck body and operatively engaging said nut, a clamp, means for pivotally mounting said clamp at a point intermediate its ends on said screw for swinging movement of said clamp in a plane passing through the axis of rotation of said screw, a driving key on said screw engaging said clamp to cause said clamp to be rotated by said screw, an abutment surface on said screw engaging an intermediate portion of said clamp in a direction of axial clamping movement of said screw, and a toe and a heel abutment surfaces on the outer ends of said clamp lying in a plane substantially perpendicular to the axis of rotation of said screw, said heel engaging the chuck body and said toe engaging a workpiece in said chuck.

2. In a crankshaft chuck, a rotary chuck body, an arcuate locating block fixed to the chuck body having an arcuate surface arranged concentric with the axis of rotation of the chuck body, a driving lug block fixed to said chuck having a radially disposed abutment driving surface positioned at one end of said arcuate locating block, and clamping means located at the other end of said arcuate locating block comprising, a nut journaled in and restricted against axial movement in said chuck body, a worm wheel formed on said nut, a worm journaled in said chuck body and operatively engaging said worm wheel, means for applying a wrench to rotate said worm, a screw journaled for both rotation and axial sliding movement in said chuck body and operatively engaging said nut, a clamp, means for pivotally mounting said clamp at a point intermediate its ends on said screw for swinging movement of said clamp in a plane passing through the axis of rotation of said screw, a driving key on said screw engaging said clamp to cause said clamp to be rotated by said screw, an abutment surface on said screw engaging an intermediate portion of said clamp in a direction of axial clamping movement of said screw, a toe and a heel abutment surfaces on the outer ends of said clamp lying in a plane substantially perpendicular to the axis of rotation of said screw, said heel engaging the chuck body and said toe engaging a workpiece in said chuck, and an abutment plug on said chuck to engage the outer end of said screw to positively limit unclamping axial movement of said screw.

3. In a crankshaft chuck, a rotary chuck body, an arcuate locating block fixed to the chuck body having an arcuate surface arranged concentric with the axis of rotation of the chuck body, a driving lug block fixed to said chuck having a radially disposed abutment driving surface positioned at one end of said arcuate locating block, and clamping means located at the other end of said arcuate locating block comprising, a nut journaled in and restricted against axial movement in said chuck body, a worm wheel formed on said nut, a worm journaled in said chuck body and operatively engaging said worm wheel, means for applying a wrench to rotate said worm, a screw journaled for both rotation and axial sliding movement in said chuck body and operatively engaging said nut, a clamp, means for pivotally mounting said clamp at a point intermediate its ends on said screw for swinging movement of said clamp in a plane passing through the axis of rotation of said screw, a driving key on said screw engaging said clamp to cause said clamp to be rotated by said screw, an abutment surface on said screw engaging an intermediate portion of said clamp in a direction of axial clamping movement of said screw, a toe and a heel abutment surfaces on the outer ends of said clamp lying in a plane substantially perpendicular to the axis of rotation of said screw, said heel engaging the chuck body and said toe engaging a workpiece in said chuck, an abutment plug on said chuck to engage the outer end of said screw to positively limit unclamping axial movement of said screw, and an abutment surface on said chuck body engaging said heel end of said clamp to limit rotation of said clamp and screw in clamping rotation, and an abutment stop pin on said chuck body engaging the toe end of said clamp to limit rotation of said clamp and screw in the opposite direction of unclamping rotation.

WALTER R. MEYER.

REFERENCES CITED

The following references are of record in the file of this patent:

UNITED STATES PATENTS

| Number | Name | Date |
|---|---|---|
| 1,488,668 | Floeter | Apr. 1, 1924 |
| 2,325,387 | Frederickson | July 27, 1943 |
| 2,354,258 | Groene | July 25, 1944 |
| 2,509,888 | Schulz | May 30, 1950 |